Nov. 26, 1946.   H. J. DE N. McCOLLUM   2,411,581
FUEL SUPPLY SYSTEM
Filed May 17, 1944   4 Sheets-Sheet 2
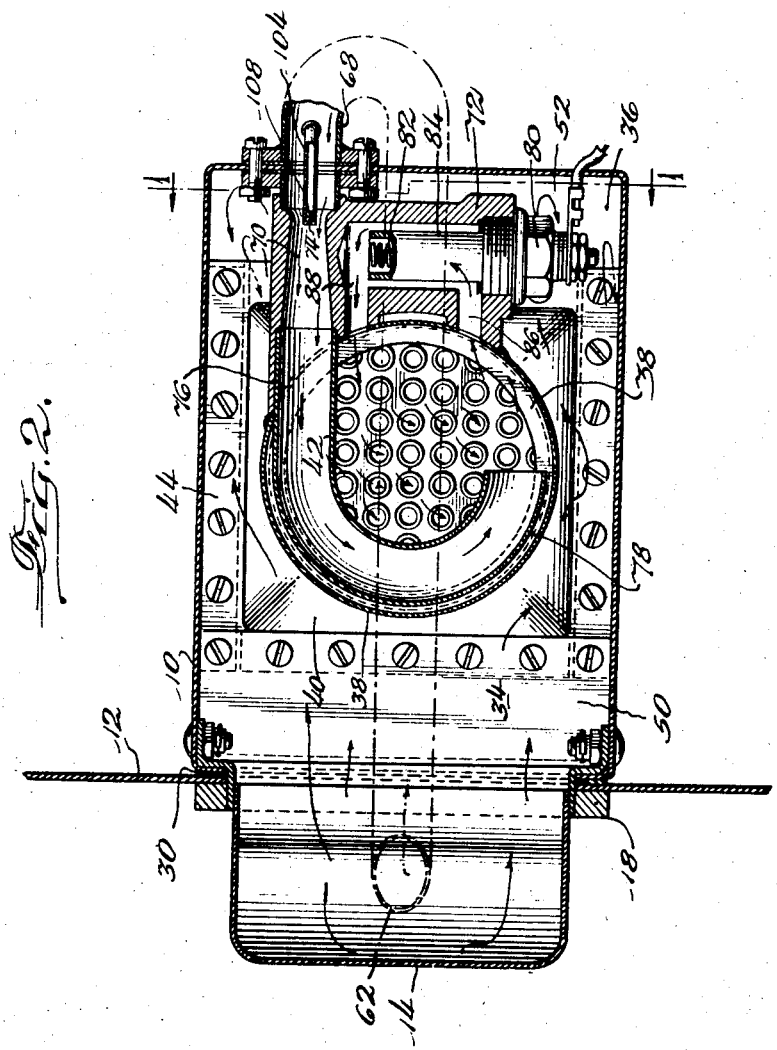

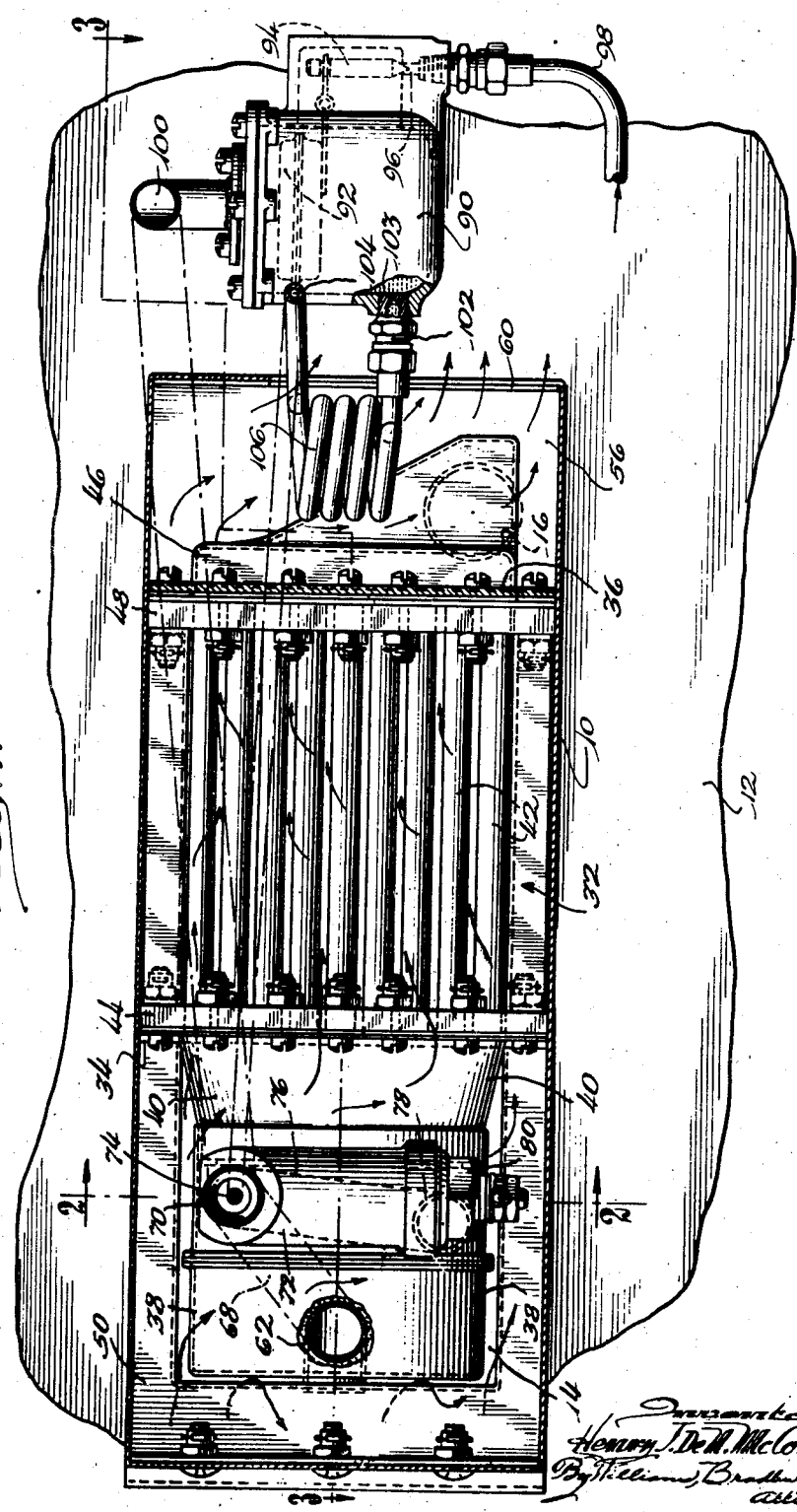

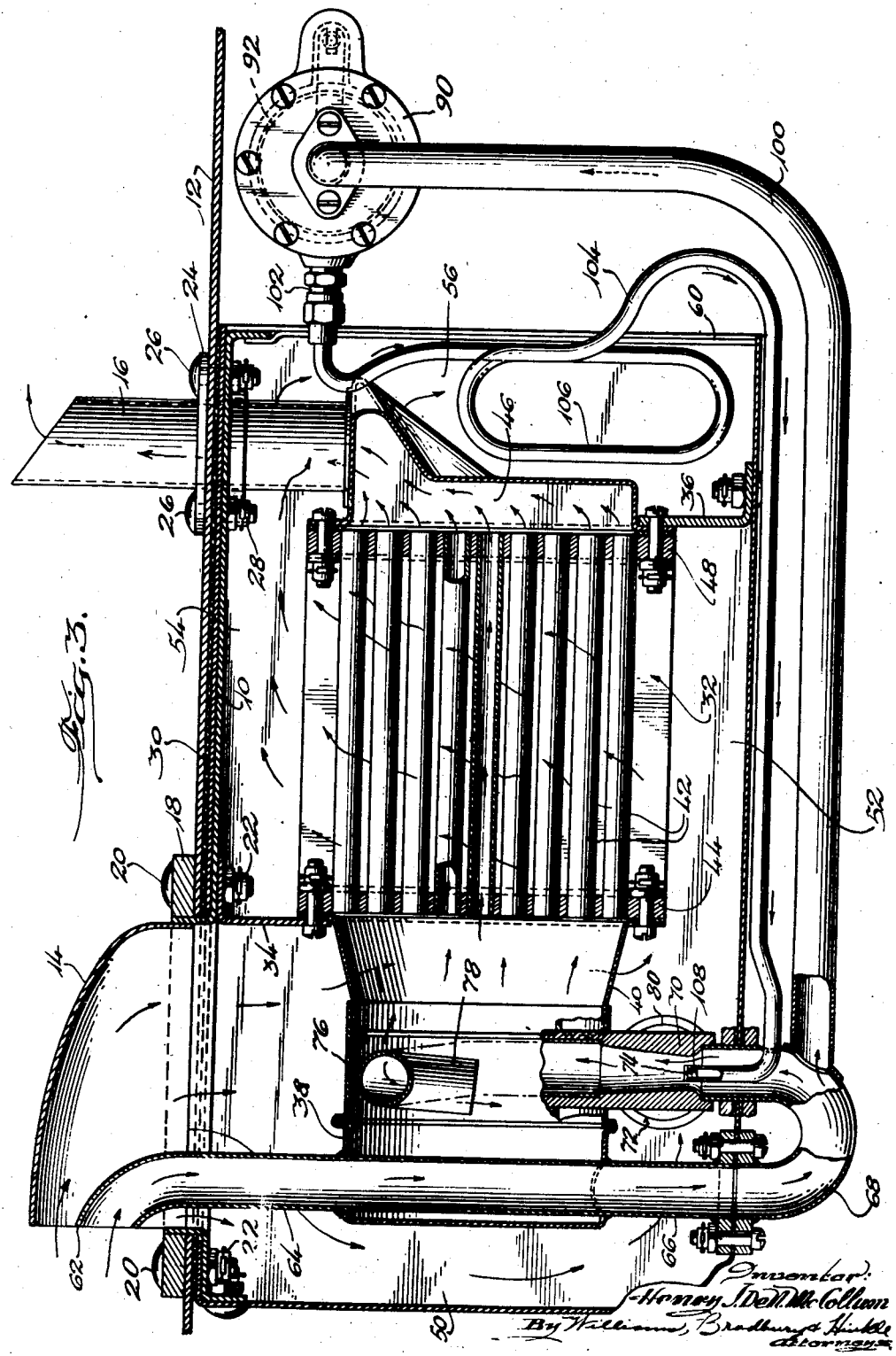

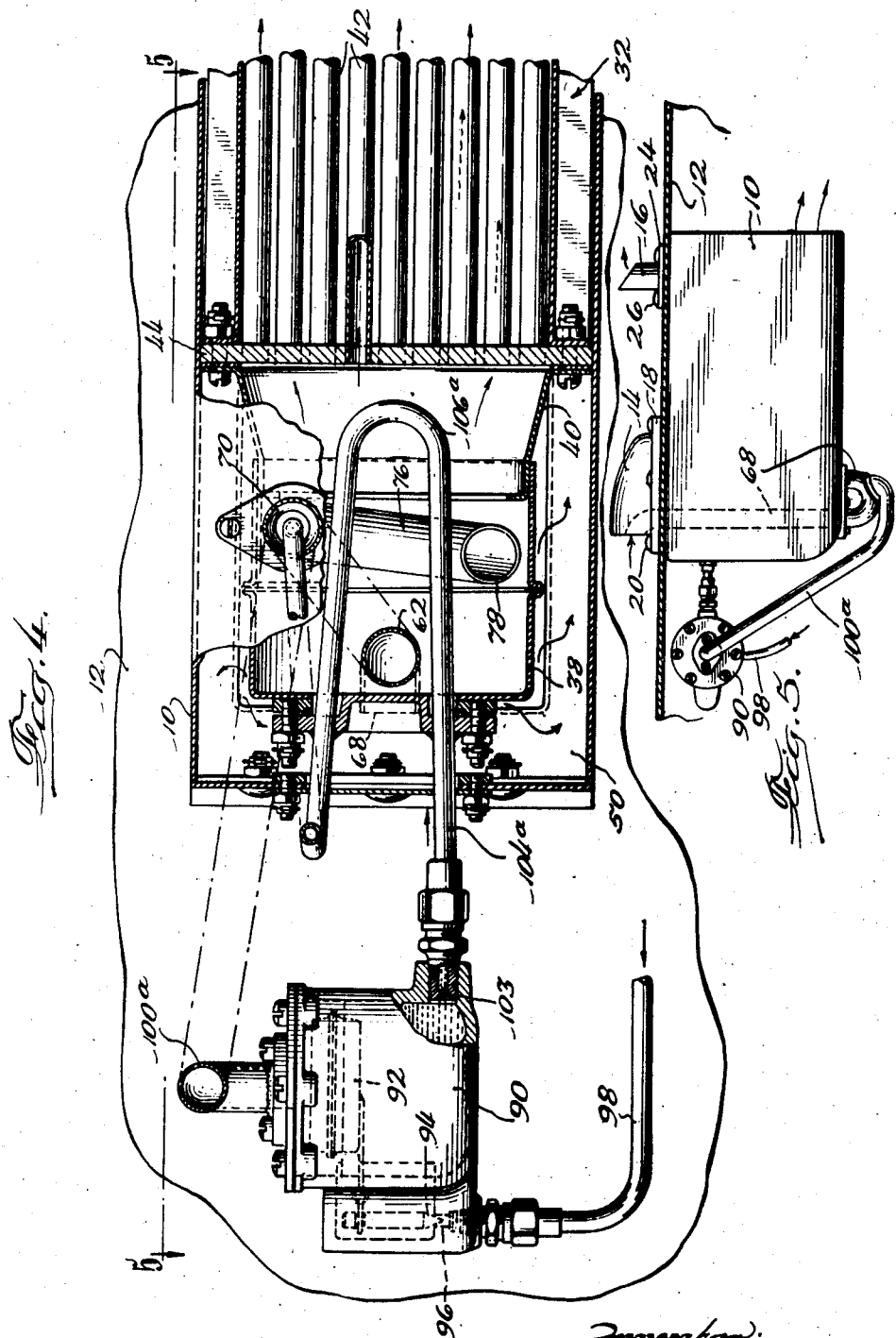

Patented Nov. 26, 1946

2,411,581

UNITED STATES PATENT OFFICE 2,411,581

FUEL SUPPLY SYSTEM

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application May 17, 1944, Serial No. 535,902

8 Claims. (Cl. 126—116)

My invention relates to fuel supply systems and more particularly to fuel supply systems for internal combustion heaters of the kind used on aircraft.

Internal combustion heaters used on aircraft are subject to variation in operation resulting from changes in altitude of the aircraft and resulting changes in the fuel mixture supplied by the ordinary carburetor under these varying conditions of altitude. Numerous and various expedients have been adopted in order to provide a fuel feeding system for such heaters to overcome this objection to the ordinary carburetor. These various expedients are frequently complicated, expensive, cumbersome, heavy, require frequent adjustment or repair, or are otherwise objectionable.

An object of my invention is to provide a new and improved fuel supply system which is simple, inexpensive, compact, lightweight and capable of providing a uniform mixture of fuel and air under varying conditions of altitude and speed.

Another object of my invention is to provide a fuel supply system having new and improved means to prevent flooding.

Another object of my invention is to provide a fuel supply system which automatically compensates for variations in altitude and which may readily be applied to existing aircraft heaters.

Another object of my invention is to provide a new and improved altitude compensating fuel supply system which can readily be built into aircraft heaters without appreciably increasing their size, weight or cost, or in any wise detracting from their normal operation.

Other objects and advantages will become apparent as the description proceeds.

In the drawings:

Fig. 1 is a longitudinal vertical section through an aircraft heater to which my invention has been applied. This figure is taken on the line 1—1 of Fig. 2;

Fig. 2 is a transverse vertical section taken on the line 2—2 of Fig. 1;

Fig. 3 is a horizontal section taken on the line 3—3 of Fig. 1;

Fig. 4 is a partial vertical longitudinal section of a modified form of my invention; and Fig. 5 is a top plan view of the modified heater installation of Fig. 4 showing in cross section the wall or other support to which the heater is attached.

The particular embodiment of my invention which I have illustrated in the drawings of this application is shown as being applied to a unitary, self-contained heater adapted to be secured to the skin of an aircraft or to a panel which is mounted in a window opening or other opening in an aircraft wall. This heater comprises a sheet metal housing 10 secured to a wall 12 of an aircraft cabin, or to a panel which may be inserted in a window opening or other opening in such a wall. The wall 12 is provided with openings through which the ventilating air ram 14 and exhaust pipe 16 project. A ring 18 surrounds the opening for the ventilating air, and screws 20 extend through this ring, wall 12 and housing 10, and engage nuts 22 attached to the inner wall of this housing. A second ring 24 surrounds the opening for the exhaust pipe, and screws 26 extend through this ring, wall 12 and housing 10, and engage nuts 28 attached to the inner wall of this housing. An asbestos or other suitable gasket 30 may be interposed between the wall 12 and housing 10.

A heat exchanger, indicated generally by reference character 32, is located in the housing 10 and is mounted on partitions 34 and 36, which form supports for this heat exchanger and also serve to direct air flow therethrough. A cylindrical combustion chamber 38 is attached to one end of the heat exchanger 32 by way of a flaring throat 40 and supplies the tubes 42 of the heat exchanger with hot products of combustion. After these products of combustion have passed lengthwise of the tubes 42 and have given up substantially all of their heat to these tubes and to inlet header 44, the cooled products of combustion enter an exhaust manifold 46 and pass therefrom into exhaust pipe 16. In addition to the inlet header 44, the heat exchanger also includes an outlet header 48, the tubes 42 being mounted in both of these headers.

When the aircraft is in motion, the ram 14 supplies ventilating air to a space 50 surrounding the combustion chamber 38. This ventilating air flows horizontally through the space 50 and around the combustion chamber 38 and absorbs heat from the walls of this combustion chamber. This ventilating air then flows into an elongated chamber 52 at one side of the heat exchanger 32, and thence horizontally through the heat exchanger to a corresponding chamber 54 on the opposite side thereof. The ventilating air absorbs heat from the heat exchanger as it passes thereover, and this heated ventilating air flows from chamber 54 into a space 56 surrounding the exhaust manifold 46. The ventilating air passes from the space 56 into the aircraft cabin or other space to be heated by way of an outlet 60 provided in an end wall of the housing 10.

The heat exchanger 32 is illustrated as having thick header plates 44 and 48 and tubes 42 having thick walls and as being of the type described more fully and claimed in my copending application Serial No. 516,648, filed January 1, 1944. The self-contained, unitary heater which I have described is like that disclosed and claimed in my copending application Serial No. 516,649, filed January 1, 1944.

Combustion air is admitted through a second ram 62 formed by the curved inlet end of a combustion air pipe 64. The ram 62 is located in the ram 14, and both of these project through the same opening in the aircraft skin 12. The combustion air pipe 64 extends transversely of one end of the combustion chamber 38, whereby combustion air flowing through this pipe is preheated, before being mixed with fuel, to form a combustible mixture. The other end 66 of the combustion air pipe 64 communicates with an elbow 68 which delivers the preheated combustion air to the inlet end of a Venturi tube 70 formed in a casting 72 attached to one wall of the combustion chamber 38. A fuel jet 74 delivers fuel vapor to the throat of the Venturi tube 70 where this fuel vapor is mixed with combustion air to form a combustible mixture. The outlet end of the Venturi tube 70 is connected to an induction tube 76 having a curved outlet end 78 located in the combustion chamber. This combustible mixture is ignited by an electrical igniter 80 having a hot wire 82 located in a pocket 84 provided by the casting 72 and communicating with the combustion chamber 38 by way of passages 86 and 88.

A novel aspect of my invention resides in the fact that vaporized fuel, instead of liquid fuel, is supplied to the jet 74. This vaporized fuel is subject to the same variations in pressure caused by altitude changes as is the combustion air to which creates the suction in the Venturi tube to draw vaporized fuel thereunto. I shall now describe the mechanism by which the foregoing novel feature of my invention is accomplished.

The jet 74 is supplied with fuel from a float bowl 90 having the usual float 92 controlling a needle valve 94 regulating admission of fuel to the float bowl through an inlet 96. A pipe 98 connects the inlet 96 with any suitable source of fuel. A pipe 100 connects the top of the float bowl with the elbow 68, through which the combustion air flows in passing from the ram 62 to the Venturi tube 70. This pipe 100, therefore, insures maintenance in the float bowl of the same pressure to which the combustion air is subjected just prior to its entry into the Venturi tube 70.

The float bowl 90 has a fuel outlet fitting 102 through which the liquid fuel leaves this float bowl. This outlet fitting is preferably provided with a restriction 103. A tube of copper or other suitable material 104 connects the outlet fitting 102 with the jet 74. This tube 104 extends into the ventilating air space 56 and has a coiled portion 106 located therein. The flow of heated ventilating air over that portion of the tube 104 which is within the space 56 vaporizes the liquid fuel in this portion of the tube so that the fuel flowing from the coiled portion 106 of the tube 104 is in vaporized form. The jet 74 is made by screwing a small plug 108 into the outlet end of the tube 104 and by providing this plug with a small orifice through which the vapor passes into the throat of the Venturi tube 70.

As the aircraft changes altitude, the pressure of the combustion air delivered to the Venturi tube will change and the mass of air flowing through this tube in a given time will likewise change. The fuel vapor delivered to the jet 74 is subject to the same pressure variations caused by altitude changes as the combustion air with which this vapor is to be admixed. The density of both gases varies with variations in this pressure, and the proportions of fuel and air in the combustible mixture formed in the Venturi tube 70 remain the same for all changes in altitude. The internal combustion heater, therefore, operates efficiently and evenly at all altitudes.

In this connection, it will be noted from Fig. 1 that the top of the coil 106 is at substantially the same elevation as the top of the liquid in the float bowl 90, so that the liquid head in this float bowl is not relied upon to supply fuel to the Venturi tube 70. That portion of the tube 104 between the coil 106 and Venturi tube 70 is inclined upwardly to a slight extent so that the rate of vapor delivery by the jet 74 is solely a function of the vacuum created at the throat of the Venturi tube by combustion air flowing therethrough.

Air flow into the rams 14 and 62 is produced by forward motion of the aircraft relative to the air through which it is traveling. The greater the speed the greater the quantity of air delivered by these rams and the greater the pressure at which this air is delivered. The pressure at the air inlet of the Venturi tube 70, therefore, varies not alone with variations in altitude but also with variations in air speed of the aircraft to which the heater is attached. All variations in pressure at the air inlet of the Venturi tube are transmitted to the float bowl 90 by pipe 100 so that the pressure on the fuel therein changes with the variations in pressure at the Venturi tube inlet, regardless of whether these pressure variations are caused by changes in altitude or changes in air speed, or both. My novel fuel supply system is, therefore, compensated for changes in both air speed and altitude and delivers a combustible mixture whose richness is not changed by variations in either speed or altitude.

The essential difference between the modification of Figs. 4 and 5 and the embodiment of Figs. 1, 2 and 3 resides in the fact that in Figs. 1, 2 and 3 the fuel line 104 has a coil 106 exposed to the ventilating air which vaporizes the fuel, whereas in the modification of Figs. 4 and 5 the fuel line has a portion extending into the combustion chamber and the fuel is vaporized by heat obtained from this chamber. Referring to Figs. 4 and 5, it will be seen that in this form of my invention the float bowl 90 is located at the forward or combustion chamber end of the heater. The fuel line 104a has a reversely bent portion 106a which extends through the combustion chamber 38 and into the flaring throat 40. This portion 106a is exposed to the hot products of combustion and absorbs sufficient heat therefrom to vaporize the fuel contained in this portion of the fuel line 104a so that the jet 74 receives only vaporized fuel instead of the usual liquid fuel. The pipe 100a which connects the top of the float bowl with the elbow 68 is shorter than the corresponding pipe 100 of the previous embodiment but performs the same function of maintaining a pressure in the float bowl corresponding at all times to the pressure at the air inlet of the Venturi tube 70. Since the operation of that form of my invention shown in Figs. 4 and 5 is the same as the operation of the previous embodiment, it is unnecessary further to describe the operation of the modification of Figs. 4 and 5.

In each of the two embodiments of my invention the heating coil which vaporizes the fuel before this fuel reaches the jet 74 receives heat as a result of heater operation. When the heater is first started, no heat is available to vaporize the fuel and liquid fuel is supplied to the jet 74. This jet is made of appropriate size to deliver the desired amount of vaporized fuel when the heater is operating normally and unless special means were provided a great excess of liquid fuel would flow through this jet when the heater is first started and would flood the heater. I have provided special means to prevent such flooding when the heater is first started and this antiflooding means constitutes an important feature of my invention.

I have previously pointed out that the outlet fitting 102 for the float bowl is provided with a restriction 103. This restriction is smaller than the jet 74 and when the heater is first started the restriction 103 rather than the jet 74 determines the quantity of fuel supplied to the heater. Since it is desirable to supply a rich mixture for starting, the restriction 103 is so designed that it will furnish a quantity of fuel slightly in excess of that required when the heater is in normal operation. As soon as the heater attains normal operating temperature, the fuel in coil 106 or 106a is vaporized and thereafter the jet 74 determines the quantity of fuel supplied to the combustion chamber.

In a heater designed to have a heat output of 10,000 B. t. u. per hour, the Venturi tube 70 would be given a throat diameter of about ⅜" and the tube 104 would have an outside diameter of ¼". The jet 74 would have a diameter of about .055" and the restriction 103 would have a diameter of about .015". In such a heater the pipe 100 or 100a would be considerably smaller than that indicated in the drawings and would probably be formed of copper tubing having an outside diameter of ¼" or ₃⁄₁₆".

It will be apparent from the foregoing description taken in connection with the accompanying drawings that applicant's novel fuel supply system incorporates no more operating parts than does the conventional carburetor. There is nothing about this new and improved fuel supply system which should cause any additional service problems or which would add appreciably to the cost or weight of the heater. Likewise, there is no increase in bulk over a conventional fuel supply system of the carburetor type, and no additional manufacturing or assembling problems are presented by my invention. In other words, my invention provides a simple, efficient and inexpensive solution for the problem of altitude and speed compensation in aircraft heaters.

While I have illustrated and described only two embodiments of my invention, it is to be understood that my invention may assume numerous other forms and includes all modifications, variations and equivalents coming within the appended claims.

I claim:

1. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, a pipe connecting said float bowl with said jet, said pipe having a part exposed to ventilating air leaving said heat exchanger whereby fuel in said pipe is vaporized before it reaches said jet, and a second pipe connecting the inlet end of said Venturi tube with the top of said float bowl.

2. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, a pipe connecting said float bowl with said jet, said pipe having a part extending into said combustion chamber whereby fuel in said pipe is vaporized before it reaches said jet, and a second pipe connecting the inlet end of said Venturi tube with the top of said float bowl.

3. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, a pipe connecting said float bowl with said jet, said pipe having a part exposed to heat from said heater whereby fuel in said pipe is vaporized before it reaches said jet, and a second pipe connecting the inlet end of said Venturi tube with the top of said float bowl.

4. An aircraft heater comprising walls forming a combustion chamber, a heat exchanger receiving hot products of combustion from said combustion chamber, means including a ram for circulating ventilating air over said heat exchanger, means for supplying a combustible mixture to said combustion chamber, means including a ram for supplying combustion air to said second-named means, a float bowl for liquid fuel, said second-named means including a fuel outlet, a pipe connecting said float bowl with said outlet, said pipe having a part exposed to heat from said heater whereby fuel in said pipe is vaporized before it reaches said outlet, and a second pipe connecting the inlet end of said second-named means with the top of said float bowl.

5. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, said jet being located slightly above the liquid level in said bowl, a pipe connecting said float bowl with said jet, said pipe having a part exposed to heat from said heater whereby fuel in said pipe is vaporized before it reaches said jet, and a second pipe connecting the inlet end of said Venturi tube with the top of said float bowl.

6. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, a pipe connecting said float bowl with said jet, said pipe having a part exposed to heat from said heater whereby fuel in said pipe is vaporized before it reaches said jet, a second pipe connecting the inlet end of said Venturi tube with the top of said float bowl, and means preventing excess flow of liquid fuel through said jet when the heater is started.

7. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, a pipe connecting said float bowl with said jet, said pipe having a part exposed to heat from said heater whereby fuel in said pipe is vaporized before it reaches said jet, a second pipe connecting the inlet end of said Venturi tube with the top of said float bowl, and means forming a restriction in said first pipe limiting flow of liquid fuel to said jet when the heater is started.

8. An aircraft heater comprising walls forming a combustion chamber, a heat exchanger receiving hot products of combustion from said combustion chamber, means including a ram for circulating ventilating air over said heat exchanger, a Venturi tube for supplying a combustible mixture to said combustion chamber, means including a ram for supplying combustion air to said Venturi tube, a float bowl for liquid fuel, a fuel jet in said Venturi tube, a pipe connecting said float bowl with said jet, said pipe having a part exposed to heat from said heater whereby fuel in said pipe is vaporized before it reaches said jet, a second pipe connecting the inlet end of said Venturi tube with the top of said float bowl, and means forming a restriction between said jet and float bowl, said restriction being smaller than said jet.

HENRY J. DE N. McCOLLUM.